United States Patent Office 3,701,690
Patented Oct. 31, 1972

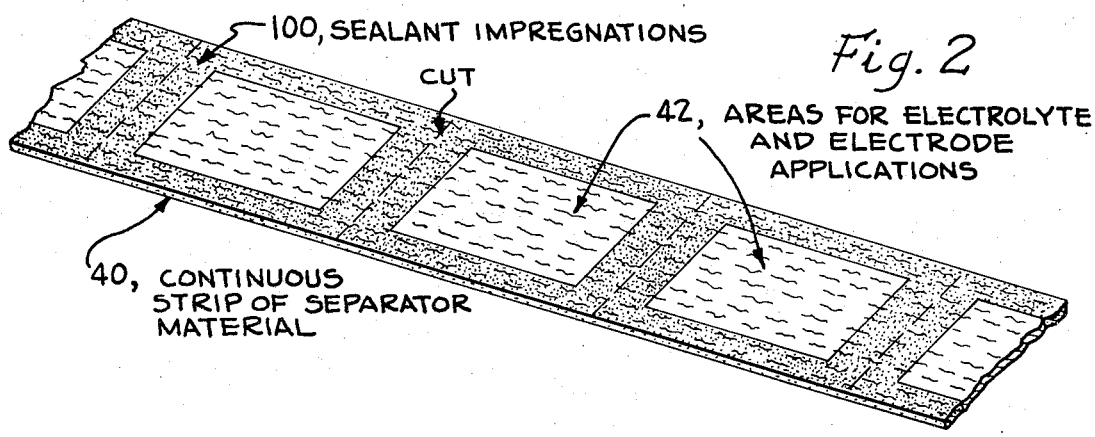
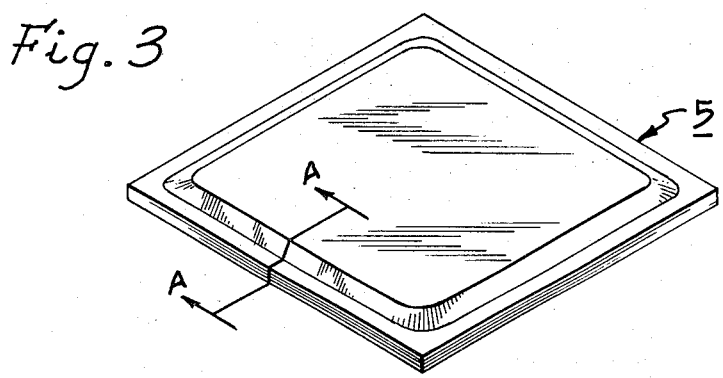
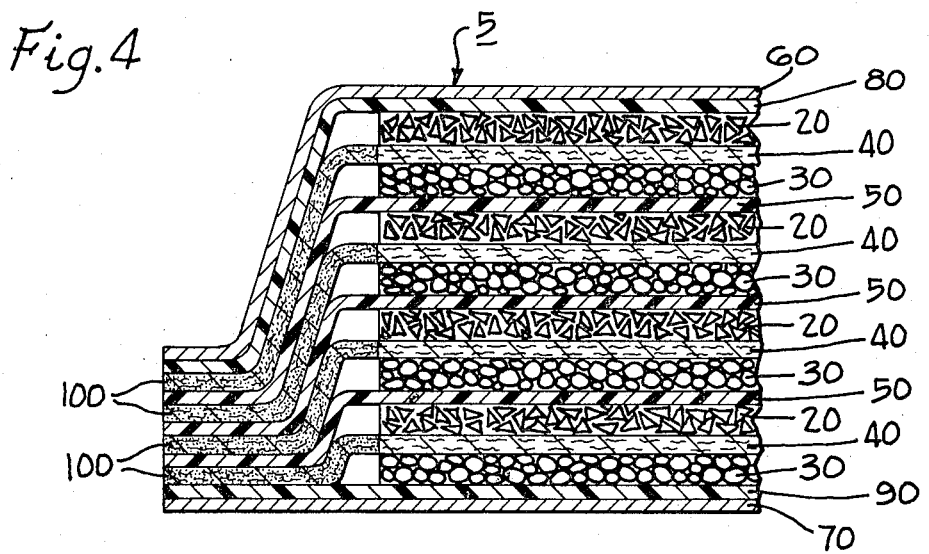

3,701,690
BATTERY HAVING SEALANT IMPREGNATED INTO SEPARATOR
William J. Dermody, Titusville, N.J., and John E. Oltman, Madison, Wis., assignors to ESB Incorporated
Filed Dec. 21, 1970, Ser. No. 99,983
Int. Cl. H01m 3/04
U.S. Cl. 136—175
16 Claims

ABSTRACT OF THE DISCLOSURE

Patches of adhesive are impregnated into battery separator material, each patch being in the form of a closed loop inside of which is an area of separator material not impregnated with the adhesive. Electrolyte is then impregnated into the area inside each patch of adhesive, after which the separator segments are assembled into batteries where the adhesive patches serve as seals.

Preferably the adhesive patches are nonconductive and are impregnated along continuous strips of separator material, and a further preference is to assemble the separator segments into the batteries which are structurally connected together by the continuous strips. After assembly of the batteries the continuous strips may be cut between patches of adhesive to obtain structurally unconnected batteries.

BACKGROUND OF THE INVENTION

One of the problems encountered in the construction of a battery is to devise a way to prevent liquids from escaping from the interior to the exterior of the battery. Loss of liquid from the electrolyte in this manner may result in decreased battery performance. Loss of electrolyte or the liquid products of discharge in this way may also cause corrosion, poisoning, undesired electrical connections, or other harmful results. To prevent these liquid losses it is desirable to enclose the battery in a liquid impervious wrapper, the edges of which are sealed together. One means of sealing the edges of the wrapper together is with a deposit of adhesive sealant around the mating edges of the wrapper. If such a deposit is applied directly and by itself onto one of the mating edges and then pressure is applied to the mating edges, the pressure may cause some of the sealant to ooze from between the edges, yet if pressure is not applied the necessary seal may not be developed.

Another consideration in developing a process by which to manufacture batteries is to devise methods and means for handling materials being assembled into the battery so that the battery may be constructed at low cost with high speed production machinery. In this regard, modern high speed machinery is better able to process continuous strips of material than to process a succession of individual pieces at an equivalent production rate. Application of this principle to battery assembly processes employing continuous strips of separator material may create other problems, however. For instance, in U.S. Pat. No. 3,494,796 there is shown a dry tape cell construction in which a series of batteries are assembled and subsequently left structurally connected in part by a continuous strip of separator material. During the assembly process described and implied in that patent, patches or marginal seal layers of adhesive are applied along continuous carrier sheets. Later these carrier strips are placed in contact with a continuous strip of separator material at which time the patches or seal layers of adhesive penetrate into the separator material in a manner intended to provide a liquid seal around the perimeter of each cell along the resultant tape. The purpose of the seal to prevent loss of electrolyte from the inside to the outside of the tape of cells as well as to prevent electrolyte from one cell from bridging or migrating to an adjacent cell along the tape; the problem of electrolyte migration from cell to cell along the tape could be serious since the separator, which may function as a wick, is in the form of a continuous strip extending continuously from one cell to another. Prior to placing these carrier strips in contact with the separator material, however, electrolyte is impregnated into the continuous strip of separator material, and therein exists the problem associated with the method described in the patent: the electrolyte is impregnated into the continuous separator strip first and subsequently patches of adhesive are introduced into the separator strip for the purpose of limiting the migration of the electrolyte and for later producing a liquid impervious seal. If the electrolyte is applied directly onto an area along the continuous separator strip where a penetration of adhesive is subsequently to be attempted, or if the electrolyte has migrated by wick action to such an area by the time of attempted adhesive penetration, then the desired degree of adhesive penetration into and seal with the separator strip may not be achieved. Even if the area in which adhesive penetration is desired is still dry at the time of penetration, the quantitative amount of the adhesive which can be penetrated into the separator strip and therefore the effectiveness of the resultant adhesive seal may be limited by the technique shown in the patent.

SUMMARY OF THE INVENTION

With this invention patches of adhesive are impregnated into battery separator material before the separator is impregnated with electrolyte and before the separator is assembled into a battery. By impregnating or penetrating the adhesive into the separator before addition of the electrolyte, not only is a dry area of separator assured during adhesive penetration but also there may be total saturation of adhesive into the separator in the intended areas. The result will be a better adhesive seal around the perimeter of each cell, reducing the amount of electrolyte which can escape from the inside to the outside of the battery or which can migrate from one battery to another where batteries are structurally connected by a continuous strip of the separator material. The separator sheets acts as a spacer to prevent the adhesive from being extruded or squeezed out from between surrounding members when the battery is being sealed.

Preferably the adhesive patches are nonconductive and are impregnated along continuous strips of separator material, and a further preference is to assemble the separable segments into batteries which are structurally connected together by the continuous strip. After assembly of the batteries the continuous strips may be cut between patches of adhesive to obtain structurally unconnected batteries. Alternatively, the continuous strip may be cut into structurally connected segments with the segments being subsequently assembled into batteries. As another alternatively the adhesive impregnations may be made into structurally unconnected segments of separator material rather than into a continuous strip of such material.

BRIEF DESCRIPTION OF THE DRAWINGS

FIG. 2 shows a portion of the continuous separator strip after patches of adhesive have been impregnated into it.

FIG. 3 is an oblique view of a multicell battery containing the adhesive impregnated separators.

FIG. 4 illustrates a cross-section of the battery shown in FIG. 3 taken along the line A—A of FIG. 3. The thickness of the battery is shown greatly magnified for purposes of illustration.

DESCRIPTION OF THE PREFERRED EMBODIMENTS

Figure 1:
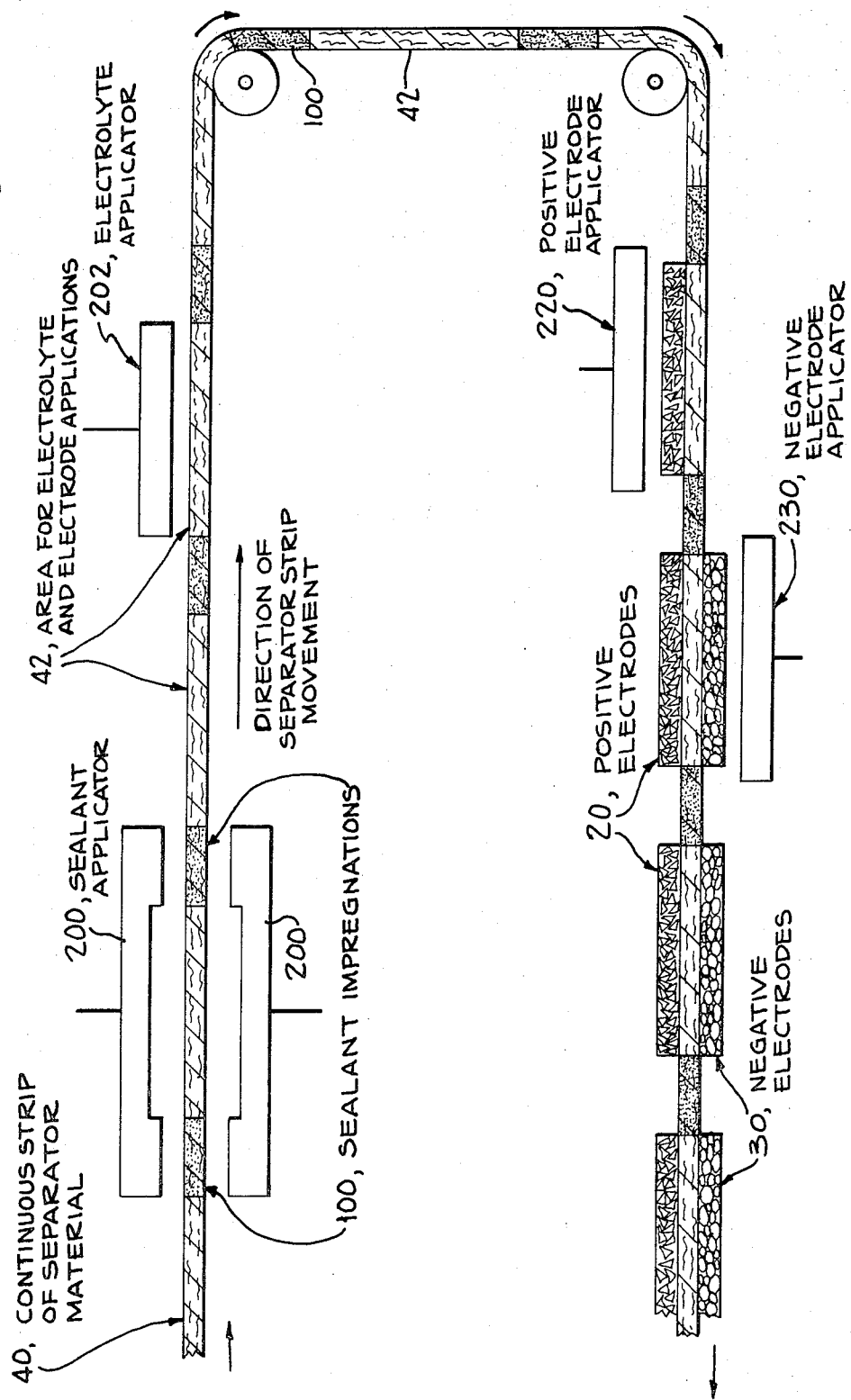
FIG. 1 is a schematic diagram showing patches of adhesive material being impregnated into a continuous strip of separator material. Subsequent to the impregnation of adhesive patches electrolyte is applied to the separator inside each patch. Still subsequently the area inside each patch of adhesive is placed between a positive electrode and a negative electrode.

FIG. 1 is schematic diagram showing patches of adhesive sealant 100 being impregnated into a continuous strip of separator material 40 by sealant applicators 200. As shown in FIG. 2, each patch of adhesive sealant 100 is in the form of a closed loop inside of which is an area 42 of the separator material not impregnated with the adhesive.

With this invention a patch of adhesive sealant 100 such as shown in FIGS. 1 and 2 is first impregnated into the separator material and subsequently electrolyte is impregnated into the areas 42 inside the adhesive patches. By impregnating the adhesive patch into dry separator material and by impregnating the adhesive in liberal quantity so that all of the pores in the separator are completely filled in the area to which the adhesive is applied and so that there is sufficient excess adhesive to result in subsequent good sealing in a battery, a superior barrier to electrolyte migration is created around the entire perimeter of a segment of the wick-like separator material. This barrier of impregnated adhesive sealant prevents the escape of electrolyte from inside the battery, thereby giving increased battery performance and reducing the threat of undesired electrical connections, corrosion, or other hazards which might result if electrolyte escaped from the battery.

From the standpoint of high speed, low cost production techniques it is highly desirable that the separator material be processed in the form of a continuous strip throughout as much of the battery production as possible, since the processing of continuous strips is preferred to the processing of individual pieces at equivalent production rates when those production rates become high. With these thoughts in mind, the drawings may be used to understand several preferred methods of battery construction. For purposes of illustration, a multicell battery 5 only is shown in the drawings, but in the paragraphs to follow the construction of a single cell battery will also be described. Referring now to FIGS. 1 and 2, a series of adhesive patches 100 are impregnated into continuous strips of battery separator material 40. (Only one such continuous strip is shown in the drawings.) Each patch is in the form of a closed loop inside of which is an area 42 of separator material not impregnated with the adhesive. The shape of the adhesive patch is shown as being rectangular, but that is not a limitation in the concept. Next, multicell batteries are assembled which are structurally connected together by at least two of the adhesive impregnated continuous separator strips. This assembly comprises a number of steps, one of which is impregnating electrolyte into the area inside each patch of adhesive along at least two of the adhesive impregnated, continuous separator strips; this step is schematically illustrated in FIG. 1 by an electrolyte applicator 202. Following the electrolyte impregnation the area inside each patch of adhesive is placed between a positive electrode 20 and a negative electrode 30. These electrodes are shown in FIG. 1 being applied on the continuous strip of separator material by positive and negative electrode applicators 220 and 230 respectively, but the electrodes may also be applied onto other substrates and those substrates with the electrodes thereon may subsequently be placed on the opposite sides of the continuous separator strip; such other substrates include not only the continuous carrier sheets illustrated in U.S. Pat. No. 3,494,796 but also others such as those which ultimately function as the intercell connector in the completed battery.

Continuing with the description of the assembly of multicell batteries and referring now to FIGS. 3 and 4, intercell connectors 50 are placed between the continuous separator strip, the intercell connectors 50 also being in the form of continuous strips at this time if desired. Subsequently a liquid impervious layer is placed around the electrodes, separators, and intercell connectors. The layer shown in FIG. 4 comprises two pieces of electrically conductive plastic 80 and 90, and on the exterior of those plastic pieces are shown metal vapor barriers 60 and 70 respectively which are optional; other liquid impervious layer constructions having other compositions may be used, and the composition or construction of the layer is not a limitation on this invention. The layer must, of course, be sealed shut to produce the liquid impervious closing around the battery which is the layer's function, and here the patches of adhesive sealant 40 may assume a new role. By extending beyond the electrodes 20 and 30 to between the intercell connectors 50 and the wrapper pieces, these adhesive patches may serve both as means for providing a liquid impervious seal around the perimeter of each intercell connector and also as means for sealing the impervious layer shut. Either alternatively or in addition, however, the adhesive patches in the separator material may be sealed on one or both of the electrodes surrounding each patch and other means may be used to provide seals around the intercell connector and to seal the impervious layer shut; with this alternative, the adhesive patches still retain their important function of acting as barriers to electrolyte migration along the wick-like separator.

As thus far described, the process results in a plurality of multicell batteries which are structurally connected to each other by at least two of the continuous strips of separator material. These batteries may simply be left in this way so as to form a tape of structurally connected batteries, or an additional and subsequent step may then be taken, that of cutting the separator strips between patches of adhesive to obtain structurally unconnected multicell batteries. FIG. 2 illustrates by dashed lines how the separator strips might be cut, and FIG. 4 illustrates one of the structurally independent multicell batteries after the continuous separator strips (and any other components assembled into the battery in the form of continuous strips) have been so cut. While FIG. 2 suggests that the separator strips might be cut between successive adhesive patches, they may also be cut into segments each of which contains two or more such adhesive patches. Cutting of the separator into segments containing two or more patches might be desirable, for instance, where two or more structurally connected batteries are desired; such batteries might be electrically unconnected to each other, or they might be electrically connected in series or parallel, depending upon other aspects of the battery construction not germane to this invention.

As a technique for constructing a plurality of structurally unconnected multicell batteries, the production techniques described above are highly advantageous, for they utilize the advantages of processing continuous strips rather than structurally individual pieces throughout the entire battery assembly, leaving to the very last the step of creating the structurally individual batteries. The process is thus well suited for use in high speed production machinery. The process also results in batteries in which electrolyte migration to the outside of the battery or from one battery to an adjacent and structurally connected battery is prevented from occurring along the wick-like separator, and the same adhesive deposits used to prevent this electrolyte migration may be used also to create seals around the perimeters of the intercell connectors and around the perimeter of the wrapper.

Cutting of the separator strips between patches of adhesive need not necessarily be postponed until the batteries have otherwise been completely assembled, however. The cutting may be done after the impregnation of adhesive patches but before separator segments containing those patches are placed between positive and negative electrodes. Where this alternative is used, the advantages of processing continuous strips rather than processing individual pieces are retained through at least a part of the battery production, and the production steps remaining after the separator is cut into individual segments may, if desired, be performed using continuous strips of other materials required in the battery.

The impregnation of the adhesive sealant patches may, if desired, also begin with individual, structurally unconnected pieces of separator material rather than a continuous strip. Even where this is done, the same advantages in preventing electrolyte migration and in using the adhesive impregnations to achieve liquid impervious seals around the intercell connectors and the liquid impervious layer are still achieved.

Single cell batteries may also be constructed using the techniques and achieving the advantages described above, the only essential difference being that only one positive and one negative electrode are used and there is no intercell connector. Otherwise the processing is essentially the same as with the multicell batteries described above. Continuous strips of separator material may be used throughout the entire battery construction process with subsequent cutting of the strips into strucurally unconnected segments coming, if at all, only after all other assembly steps have been completed. Alternative, the continuous separator strip may be cut into structurally unconnected segments after adhesive impregnation but before positive and negative electrodes are placed on opposite sides of the segment, or the adhesive impregnation may be made initially into a series of structurally unconnected segments of separator material which are subsequently assembled into individual single cell batteries as described above. The adhesive patches may be placed between the edges of the liquid impervious layer so as to function as sealing means for the layer and/or the adhesive patches may be sealed to one or both of the electrodes.

Several observations should be made in regard to the role of the adhesive patches in sealing around the perimeters of intercell connectors and between mating edges of the liquid impervious layer. As stated earlier, the adhesive should be applied in liberal quantity so that all of the pores in the separator are completely filled in the area to which the adhesive is applied and so that there is sufficient excessive adhesive to coat and adhere to the other members being sealed by the patches. The adhesives should be electrically nonconductive where used between two electrically conductive members between which the passage of current is to be prevented, such as between electrically conductive intercell connectors and the electrically conductive layer or conductive means. The adhesives themselves may be selected from a wide variety of materials including such adhesive cements as catalyzed uncured epoxy resins, phenolic resin solutions, ethylene coplymer hot melts, pressure sensitive elastomer mixtures, thermoplastic resin solution, and natural gums and resins and their solutions. Faster and more thorough and complete impregnation of the adhesive into the separator may be achieved with many hot melt cements by making the impregnations with heated adhesives. The adhesives which may be used may be ones which attain their adhesive quality for the first time during assembly of the battery as a result of the application of presssure, heat, ultrasonics, or other forms of energy. Compared with battery constructions in which the same adhesives might be used around the perimeters of intercell connectors or between the edges of layers without the adhesive first being impregnated into the separator, this invention results in an improvement by reducing the tendency for the adhesive sealant to ooze out from the surfaces being sealed while the required heat and/or pressure is being applied; the solid structure of the adhesive impregnated separator acts as a spacer to prevent the adhesive from being extruded or squeezed out from between surrounding members when the battery is being sealed.

The separator 40 may be made from a wide variety of materials including the synthetic fibers, microporous polymer sheets, and cellulosic materials which are conventional in battery construction as well as from woven or nonwoven fibrous materials such as polyester, nylon, polypropylene, and polyethylene.

The batteries made by using the process of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the Le Clanche system (ammonium chloride and/or zinc chloride), various alkaline electrolytes such as the hydroxides of potassium, sodium and/or lithium, acidic electrolytes such as sulfuric or phosphoric acid, and nonaqueous electrolytes, the electrolytes of course chosen to be compatible with the positive and negative electrodes.

Among the wide variety of electrochemical systems which may be used in the batteries are those in which the positive electrodes comprise manganese dioxide, the negative electrodes comprise metals such as zinc, aluminum, or magnesium, and the electrolyte substantially comprises an acidic solution of inorganic salts. Another commonly known system useful in the batteries is the alkaline manganese system in which the positive electrodes comprise manganese dioxide, the negative electrodes comprise zinc, and the electrolyte substantially comprises a solution of potassium hydroxide. Other acqueous electrolyte systems including those of nickel-zinc, silver-zinc, mercury-zinc, mercury-cadmium, and nickel-cadmium may also be used. Systems employing organic positive electrodes and acidic electrolytes may also be used including rechargeable systems using azodicarbonamide compound electrodes and Le Clanche electrolyte.

Where this invention is used in the construction of multicell batteries, any of several constructions of intercell connectors may be used. The particular intercell connector 50 shown in FIG. 4 comprises a single member made from an electrically conductive plastic. The intercell connector 50 might also comprise other electrically conductive single members such as metal sheets or foils, or it might collectively comprise two or more members each of which is conductive. Alternatively, intercell connector 50 might comprise the combination of a nonconductive member and one or more conductive members which extend through or around the edge of the nonconductive member.

I claim:

1. The method of constructing multicell batteries comprising the steps of:
   (a) impregnating a series of patches of adhesive into at least two continuous strips of battery separator material, each patch being in the form of a closed loop inside of which is an area of separator material not impregnated with the adhesive; and, then,
   (b) assembling multicell batteries which are structurally connected together by at least two of the adhesive impregnated continuous separator strips, the method of assembling the multicell batteries comprising the steps of
      (i) impregnating electrolyte into the area inside each patch of adhesive along at least two of the adhesive impregnated continuous separator strips, (ii) placing the area inside each patch of adhesive along each strip between a positive electrode and a negative electrode, (iii) placing intercell connectors between the continuous separator strips, (iv) placing a liquid impervious layer around the electrodes, separators, and intercell connectors, and (v) sealing the layer and the intercell connectors to the adhesive patches impregnated into the continuous separator strips.

2. The method of claim 1 together with the additional subsequent steps of cutting the separator strips between successive patches of adhesive to obtain structurally unconnected multicell batteries.

3. The method of constructing multicell batteries comprising the steps of:
 (a) impregnating a series of patches of adhesive into at least two continuous strips of battery separator material, each patch being in the form of a closed loop inside of which is an area of separator material not impregnated with the adhesive; and then,
 (b) assembling multicell batteries which are structurally connected together by at least two of the adhesive impregnated continuous separator strips, the method of assembling the multicell batteries comprising the steps of
  (i) impregnating electrolyte into the area inside each patch of adhesive along at least two of the adhesive impregnated, continuous separator strips,
  (ii) placing the area inside each patch of adhesive along each strip between a positive electrode and a negative electrode,
  (iii) sealing each patch of adhesive to at least one of the electrodes surrounding the patch,
  (iv) placing intercell connectors between the continous separator strips, and
  (v) sealing a liquid impervious layer around the electrodes, separators, and intercell connectors.

4. The method of claim 3 together with the additional subsequent step of cutting the separator strips between successive patches of adhesive to obtain structurally unconnected multicell batteries.

5. The method of constructing multicell batteries comprising the steps of:
 (a) impregnating a series of patches of adhesive into a continuous strip of battery separator material, each patch being in the form of a closed loop inside of which is an area of separator material not impregnated with the adhesive;
 (b) cutting the separator strip between successive patches to obtain structurally unconnected segments of separator, each of which segments contains a patch of adhesive;
 (c) impregnating electrolyte into the areas inside at least two of the patches; and then,
 (d) assembling a multicell battery containing at least two of the electrolyte impregnated separator segments by
  (i) placing at least two of the electrolyte impregnated separator segments between positive and negative electrodes so that each such segment is between a positive electrode and a negative electrode,
  (ii) placing intercell connectors between the electrolyte impregnated segments,
  (iii) placing a liquid impervious layer around the electrodes, separators, and intercell connectors, and,
  (iv) sealing the layer and the intercell connectors to the adhesive patches impregnated into the electrolyte impregnated segments.

6. The method of constructing multicell batteries comprising the steps of:
 (a) impregnating a series of patches of adhesive into a continous strip of battery separator material, each patch being in the form of a closed loop inside of which is an area of separator material not impregnated with the adhesive;
 (b) cutting the separator strip between successive patches to obtain structurally unconnected segments of separator, each of which segments contains a patch of adhesive;
 (c) impregnating electrolyte into the areas inside at least two of the patches; and then,
 (d) assembling a multicell battery containing at least two of the electrolyte impregnated separator segments by
  (i) placing at least two of the electrolyte impregnated separator segments between positive and negative electrodes so that each such segment is between a positive electrode and a negative electrode,
  (ii) sealing the batch of adhesive in each of the electrolyte impregnated separator segments to at least one of the surrounding electrodes,
  (iii) placing intercell connectors between the electrolyte impregnated segments, and
  (iv) sealing a liquid impervious layer around the electrodes, electrolyte impregnated segments, and intercell connectors, 7. The method of constructing a single cell battery comprising the steps of:
 (a) impregnating a series of patches of adhesive into a continuous strip of battery separator material, each patch being in the form of a closed loop inside of which is an area of separator material not impregnated with the adhesive; and then,
 (b) assembling single cell batteries which are structurally connected together by adhesive impregnated continuous separator strips, the method of assembling the single cell batteries comprising the steps of
  (i) impregnating electrolyte into the area inside each patch of adhesive,
  (ii) placing the area inside each patch of adhesive between a positive electrode and a negative electrode,
  (iii) placing a liquid impervious layer around the electrodes and separator, and
  (iv) sealing the layer to the separator by the adhesive patches impregnated into the continuous separator strip.

8. The method of claim 7 together with the additional subsequent step of cutting the separator strip between successive patches of adhesive to obtain structurally unconnected single cell batteries.

9. The method of constructing single cell batteries comprising the steps of:
 (a) impregnating a series of patches of adhesive into a continuous strip of battery separator material, each patch being in the form of a closed loop inside of which is an area of separator material not impregnated with the adhesive; and then,
 (b) assembling single cell batteries which are structurally connected together by the adhesive impregnated continuous separator strip, the method of assembling the single cell batteries comprising the steps of
  (i) impregnating electrolyte into the area inside each patch of adhesive,
  (ii) placing each patch of adhesive between a positive electrode and a negative electrode,
  (iii) sealing each patch of adhesive to at least one of the electrodes surrounding the patch, and
  (iv) sealing a liquid impervious layer around the electrodes and separator.

10. The method of claim 9 together with the additional subsequent step of cutting the separator strip between successive patches of adhesive to obtain structurally unconnected single cell batteries.

11. The method of constructing a single cell battery comprising the steps of:
   (a) impregnating a series of patches of adhesive into a continuous strip of battery separator material, each patch being in the form of a closed loop inside of which is an area of separator material not impregnated with the adhesive;
   (b) cutting the separator strip between successive patches to obtain structurally unconnected segments of separator, each of which segments contains a patch of adhesive;
   (c) impregnating electrolyte into the area inside one of the patches; and then
   (d) assembling a single cell battery containing the electrolyte impregnated separator segment by
      (i) placing the electrolyte impregnated separator segment between a positive electrode and a negative electrode,
      (ii) sealing at least one of the electrodes to the patch of adhesive inside the segment of electrolyte impregnated separator, and
      (iii) sealing a liquid impervious layer around the electrodes and the segment of electrolyte impregnated separator.

12. The method of constructing a single cell battery comprising the steps of:
   (a) impregnating a series of patches of adhesive into a continuous strip of battery separator material, each patch being in the form of a closed loop inside of which is an area of separator material not impregnated with the adhesive;
   (b) cutting the separator strip between successive patches to obtain structurally unconnected segments of separator, each of which segments contains a patch of adhesive;
   (c) impregnating electrolyte into the area inside one of the patches; and then
   (d) assembling a single cell battery containing the electrolyte impregnated separator segment by
      (i) placing the electrolyte impregnated separator segment between a positive electrode and a negative electrode,
      (ii) placing a liquid impervious layer around the electrodes and the electrolyte impregnated separator segment, and
      (iii) sealing the layer to the electrolyte impregnated separator segment by the adhesive patch impregnated in that segment.

13. The method of constructing a single cell battery comprising the steps of:
   (a) impregnating a patch of adhesive into a segment of battery separator material, the patch being in the form of a closed loop inside of which is an area of separator material not impregnated with the adhesive;
   (b) impregnating electrolyte into the area inside the patch of adhesive;
   (c) placing the area inside the patch of adhesive between a positive electrode and a negative electrode;
   (d) sealing at least one of the electrodes to the patch of adhesive inside the segment of electrolyte impregnated separator; and,
   (e) sealing a liquid impervious layer around the electrodes and the segment of electrolyte impregnated separator.

14. The method of constructing a single cell battery comprising the steps of:
   (a) impregnating a patch of adhesive into a segment of battery separator material, the patch being in the form of a closed loop inside of which is an area of separator material not impregnated with the adhesive;
   (b) impregnating electrolyte into the area inside the patch of adhesive;
   (c) placing the area inside the patch of adhesive between a positive electrode and a negative electrode;
   (d) placing a liquid impervious layer around the electrodes and separator; and,
   (e) sealing the layer to the separator by the adhesive patch impregnated into the separator.

15. The method of constructing a multicell battery comprising the steps of:
   (a) impregnating a patch of adhesive into each of at least two segments of battery separator material, each patch being in the form of a closed loop inside of which is an area of separator material not impregnated with the adhesive;
   (b) impregnating electrolyte into the area inside each patch of adhesive;
   (c) placing the area inside each patch of adhesive between a positive electrode and a negative electrode;
   (d) sealing each patch of adhesive to at least one of the electrodes surrounding the patch;
   (e) placing intercell connectors between the separator segments; and,
   (f) sealing a liquid impervious layer around the electrodes, separators, and intercell connectors.

16. The method of constructing a multicell battery comprising the steps of:
   (a) impregnating a patch of adhesive into each of at least two segments of battery separator material, each patch being in the form of a closed loop inside of which is an area of separator material not impregnated with the adhesive;
   (b) impregnating electrolyte into the area inside each patch of adhesive;
   (c) placing the area inside each patch of adhesive between a positive electrode and a negative electrode;
   (d) placing intercell connectors between the separator segments;
   (e) placing a liquid impervious layer around the electrodes, separators, and intercell connector; and
   (f) sealing the layer and the intercell connectors to the adhesive patches impregnated into the separator segments.

References Cited
UNITED STATES PATENTS

| | | | |
|---|---|---|---|
| 3,239,380 | 3/1966 | Berchielli | 136—83 R |
| 3,563,805 | 2/1971 | Deierhoi | 136—111 |
| 3,076,052 | 1/1963 | Tamminen | 136—175 |
| 2,844,641 | 7/1958 | Lang et al. | 136—175 |
| 3,494,796 | 2/1970 | Grulke et al. | 136—83 R |

DONALD L. WALTON, Primary Examiner

U.S. Cl. X.R.

136—145